United States Patent
Kim

(10) Patent No.: US 11,526,024 B2
(45) Date of Patent: Dec. 13, 2022

(54) DETACHABLE HOLOGRAPHIC APPARATUS FOR A PORTABLE ELECTRONIC DEVICE

(71) Applicant: DOUBLEME, INC, San Jose, CA (US)

(72) Inventor: Heekwan Kim, San Jose, CA (US)

(73) Assignee: DoubleMe, Inc., Seoul (KR)

( * ) Notice: Subject to any disclaimer, the term of this patent is extended or adjusted under 35 U.S.C. 154(b) by 384 days.

(21) Appl. No.: 16/779,469

(22) Filed: Jan. 31, 2020

(65) Prior Publication Data

US 2020/0249494 A1     Aug. 6, 2020

Related U.S. Application Data

(60) Provisional application No. 62/799,740, filed on Jan. 31, 2019.

(51) Int. Cl.
*G02B 30/40* (2020.01)
*G06F 3/01* (2006.01)
*H04B 1/3877* (2015.01)

(52) U.S. Cl.
CPC .............. *G02B 30/40* (2020.01); *G06F 3/017* (2013.01); *H04B 1/3877* (2013.01)

(58) Field of Classification Search
CPC ........ G02B 30/40; G02B 30/50; G02B 30/56; G06F 3/017; H04B 1/3877
See application file for complete search history.

(56) References Cited

U.S. PATENT DOCUMENTS

| 2015/0248014 A1* | 9/2015 | Powell | G02F 1/1334 |
| | | | 359/479 |
| 2017/0023911 A1* | 1/2017 | Russell | G03B 21/62 |
| 2019/0187469 A1* | 6/2019 | Segal | G02B 30/56 |

FOREIGN PATENT DOCUMENTS

FR         3022040 A1 * 12/2015

* cited by examiner

*Primary Examiner* — Alexander Eisen
*Assistant Examiner* — Cory A Almeida
(74) *Attorney, Agent, or Firm* — Invent Capture, LLC.; Samuel S. Cho

(57) ABSTRACT

A novel detachable holographic apparatus incorporates a dedicated upper shelf section that orients a portable electronic device's display screen to face downward after being inserted into the dedicated upper shelf section of the apparatus. The upper shelf section is created with a smartphone holder made of a rectangular center opening surrounded by a surrounding frame. The rectangular center opening allows the portable electronic device's display screen to project an image downward from the dedicated upper shelf section. The novel detachable holographic apparatus also incorporates a transparent display sheet or a one-way mirror sheet underneath the dedicated upper shelf section at a 45-degree angle relative to the surface of the portable electronic device's display screen, which in turn engender partial optical refractions and/or reflections of the image originating from the portable electronic device's display screen to form a hologram near the transparent display sheet or the one-way mirror sheet.

10 Claims, 15 Drawing Sheets

1000B

A Fully-Installed Application View of the Detachable Holographic Display Apparatus Integrating a Wireless Charger and a Gesture Interface (i.e. "HoloTube Lite Plus") for a Portable Electronic Device A Detachable Holographic Display Apparatus Made from a Cardboard (i.e. "Holo Cardboard Plus") for a Portable Electronic Device An Application View of the Detachable Holographic Display Apparatus Made from a Cardboard (i.e. "Holo Cardboard Plus") for a Portable Electronic Device An Individual Component Diagram for the Detachable Holographic Display Apparatus Made from a Cardboard (i.e. "Holo Cardboard Plus") for a Portable Electronic Device

300

An Assembly Sequence Diagram for the Detachable Holographic Display Apparatus Made from a Cardboard (i.e. "Holo Cardboard Plus") for a Portable Electronic Device

400A

A Detachable Holographic Display Apparatus Made from a Cardboard (i.e. "Holo Cardboard 01") for a Portable Electronic Device A Frontal View of the Detachable Holographic Display Apparatus Made from a Cardboard (i.e. "Holo Cardboard 01") for a Portable Electronic Device A Perspective View of the Detachable Holographic Display Apparatus Made from a Cardboard (i.e. "Holo Cardboard 01") for a Portable Electronic Device

500

An Individual Component Diagram for the Detachable Holographic Display Apparatus Made from a Cardboard (i.e. "Holo Cardboard 01") for a Portable Electronic Device

600

An Assembly Sequence Diagram for the Detachable Holographic Display Apparatus Made from a Cardboard (i.e. "Holo Cardboard 01") for a Portable Electronic Device

700B

An Application View of the Detachable Holographic Display Apparatus Made from a Cardboard (i.e. "Holo Cardboard 02") for a Portable Electronic Device

800

An Individual Component Diagram for the Detachable Holographic Display Apparatus Made from a Cardboard (i.e. "Holo Cardboard 02") for a Portable Electronic Device

900

An Assembly Sequence Diagram for the Detachable Holographic Display Apparatus Made from a Cardboard (i.e. "Holo Cardboard 02") for a Portable Electronic Device

1000A

A Detachable Holographic Display Apparatus Integrating a Wireless Charger and a Gesture Interface (i.e. "HoloTube Lite Plus") for a Portable Electronic Device

1000B

A Fully-Installed Application View of the Detachable Holographic Display Apparatus Integrating a Wireless Charger and a Gesture Interface (i.e. "HoloTube Lite Plus") for a Portable Electronic Device

DETACHABLE HOLOGRAPHIC APPARATUS FOR A PORTABLE ELECTRONIC DEVICE

BACKGROUND OF THE INVENTION

The present invention generally relates to three-dimensional (3D) hologram image display. More specifically, the present invention relates to a detachable and portable holographic display apparatus that operates as an add-on accessory to a mobile communication device or another portable electronic device.

Modern smart phones and tablet computers are becoming increasingly more capable of providing three-dimensional (3D) graphics contents. Conventionally, the 3D graphics contents displayed on a portable display device screen requires a user to wear 3D glasses to experience the z-axis, or the depth perception of the 3D graphics contents. In some cases, the 3D graphics contents are autostereoscopic and may be displayed on the portable display device screen for experiencing the depth perception even without the 3D glasses. However, because the portable display device screen itself in either cases is still merely a two-dimensional planar device, what the user experiences in the conventional portable display setup is simply a simulated depth perception on a two-dimensional planar surface, as opposed to a true three-dimensional content observation experience with a physical z-axis for real depth perception.

Therefore, it may be beneficial to devise a novel 3D display apparatus with a physical depth axis for real-depth perception of 3D contents generated in a portable electronic device. Furthermore, it may also be beneficial to devise the novel 3D display apparatus with the physical depth axis for real-depth perception to be easily attachable to or detachable from the portable electronic device. In addition, it may also be beneficial to devise the novel 3D display apparatus with the physical depth axis to be easily and inexpensively constructed not only from dedicated mobile device accessory manufacturers, but also from casual consumers with little to no device assembly experience or assembly equipment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a detachable holographic display apparatus made from a cardboard is disclosed. This cardboard-based detachable holographic display apparatus is configured to dock a portable electronic device on an upper shelf with its display screen facing downward towards an angled transparent display sheet or an angled mirrored sheet, which provides a refractive and/or reflective holographic 3D image of an image displayed on the flat display screen of the portable electronic device. Preferably, the angle of the transparent display sheet or the mirrored sheet is approximately 45 degrees relative to the flat display screen of the portable electronic device, and the back of the cardboard-based detachable holographic display apparatus provides an additional physical space behind the angled transparent display sheet or the angled mirrored sheet, wherein the additional physical space is contained by the cardboard in part for generating and maintaining a physical depth perception (i.e. z-axis) for the refractive and/or reflective holographic 3D image transformed from the flat display screen of the portable electronic device through optical refraction and/or reflection by the transparent display sheet.

In another embodiment of the invention, a detachable holographic display apparatus is made of cardboards or plastic materials, and further incorporates a wireless charger and a wireless power supply unit to charge a portable electronic device while being docked into an upper shelf with its display screen facing downward towards an angled transparent display sheet or an angled mirrored sheet. The angled transparent display sheet or the angled mirrored sheet provides a refractive and/or reflective holographic 3D image of an image displayed on the flat display screen of the portable electronic device. Preferably, the angle of the transparent display sheet or the mirrored sheet is approximately 45 degrees relative to the flat display screen of the portable electronic device, and the back of the detachable holographic display apparatus provides an additional physical space behind the angled transparent display sheet or the angled mirrored sheet, wherein the additional physical space is contained by the apparatus in part for generating and maintaining a physical depth perception (i.e. z-axis) for the refractive and/or reflective holographic 3D image transformed from the flat display screen of the portable electronic device. Furthermore, in some embodiments of the invention, the detachable holographic display apparatus may also incorporate a gesture recognition interface unit that allows a hand and/or finger gesture-based direct user interaction between the refractive and/or reflective holographic 3D image and the user's hand and/or finger gesture commands.

DETAILED DESCRIPTION

Figure 1A:
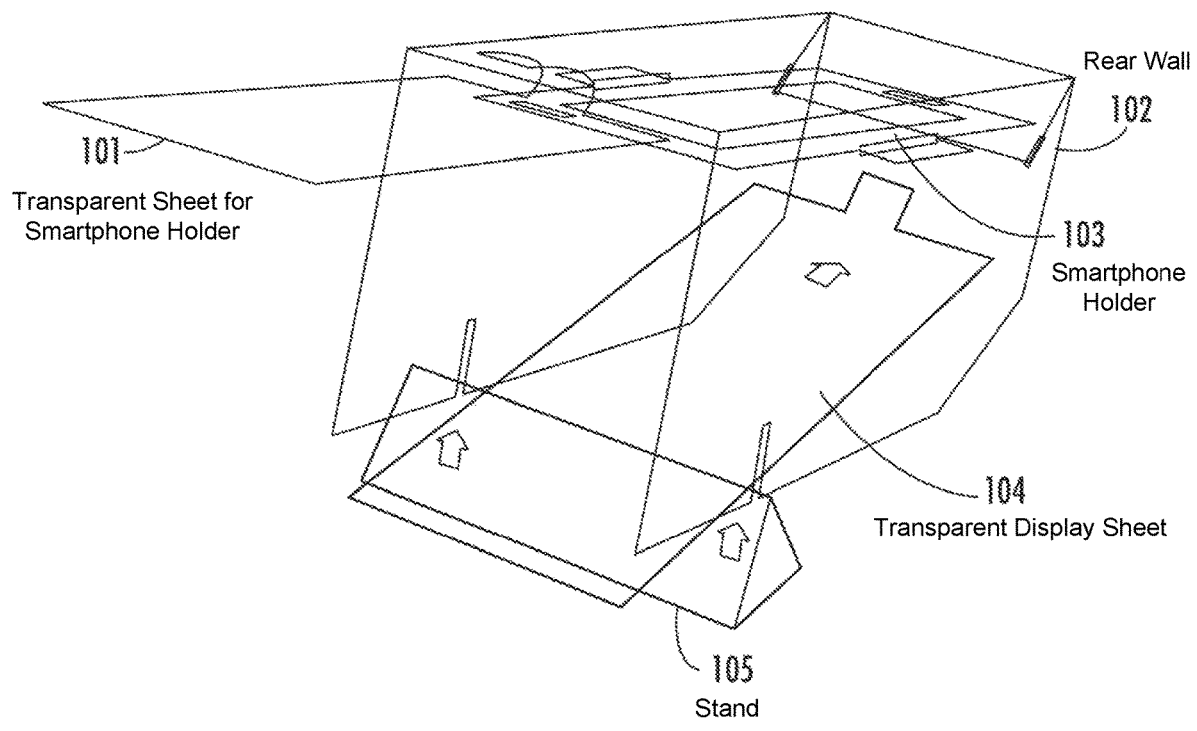
FIG. 1A shows a detachable holographic display apparatus made from a cardboard (i.e. "Holo Cardboard Plus") for a portable electronic device, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more detachable holographic apparatuses for portable electronic devices and related methods of operation. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel detachable holographic apparatus with a physical depth axis for real-depth perception of 3D contents generated in a portable electronic device.

Furthermore, another objective of an embodiment of the present invention is to provide a novel detachable holographic apparatus with a physical depth axis for real-depth perception to be easily attachable to or detachable from the portable electronic device.

In addition, another objective of an embodiment of the present invention is to provide a novel detachable holographic apparatus with a physical depth axis to be easily and inexpensively constructed not only from dedicated mobile device accessory manufacturers, but also from casual consumers with little to no device assembly experience or assembly equipment.

For the purpose of describing the invention, a term referred to as a "hologram," a "holographic object," or a "holographic image," is defined as a three-dimensional object or a three-dimensional image, which is computer-generated on a display screen, and in certain instances, transformed to be reflected and/or refracted on an angled transparent sheet or an angled mirror sheet to provide a physical depth (i.e. z-axis) 3D perception during the display of the reflected and/or refracted three-dimensional object or image.

FIG. 1A shows a detachable holographic display apparatus (100A) made from a cardboard (i.e. "Holo Cardboard Plus") for a portable electronic device, in accordance with an embodiment of the invention. As shown in FIG. 1A, the detachable holographic display apparatus (100A) comprises a transparent sheet (101) configured to be encapsulated or surrounded by a smartphone holder (103), which serves as an upper shelf of the apparatus to hold the portable electronic device with its display facing down, when the apparatus is fully constructed. Typically, the smartphone holder (103) comprises a surrounding frame with a rectangular center opening. The detachable holographic display apparatus (100A) also includes a rear wall (102), a transparent display sheet (104) diagonally angled at 45 degrees inside the apparatus casing, or at another desired angle relative to the ground, the portable electronic device display screen, or another flat surface, and a stand (105) configured to ensure a lower portion of the transparent display sheet (104) to maintain the desired angle within the apparatus.

Furthermore, as shown in FIG. 1A, an upper portion of the transparent display sheet (104) can incorporate a tab that can be inserted into a slot on an edge of the smartphone holder (103) to provide the desired angle (e.g. 45 degrees) for real depth axis-based display of three-dimensional holograms. When the detachable holographic display apparatus (100A) is fully assembled, a smartphone or another portable electronic device can be slotted into the upper shelf with its display screen facing down. Then, the portable electronic device can display an image on its display screen, and this image is subsequently refracted and/or reflected on the transparent display sheet (104) at approximately 45 degrees relative to the display screen of the portable electronic device to produce a corresponding 3D hologram (e.g. 106 in FIG. 2) of the image.

In the preferred embodiment of the invention, the backspace between the rear face of the transparent display sheet (104) and the rear wall (102) of the detachable holographic display apparatus (100A) provides an additional physical space that accommodates a physical depth perception (i.e. z-axis) for the hologram (e.g. 106 of FIG. 2) transformed from the flat display screen of the portable electronic device. Furthermore, the transparent sheet (101) for the smartphone holder (103) and the transparent display sheet (104) for displaying holograms may be made of transparent acrylic, plastic, or glass materials. Moreover, in an alternate embodiment of the invention, the detachable holographic display apparatus (100A) may be made of plastic, rubber, metallic alloy, or a combination thereof, instead of cardboard materials. Furthermore, in some embodiments of the invention, the detachable holographic display apparatus (100A) may not include and/or utilize the transparent sheet (101) for the smartphone holder (103), and instead maintain a void in the rectangular center opening of the smartphone holder (103) to enable its display screen to project onto the transparent display sheet (104) directly through the void.

Figure 1B:
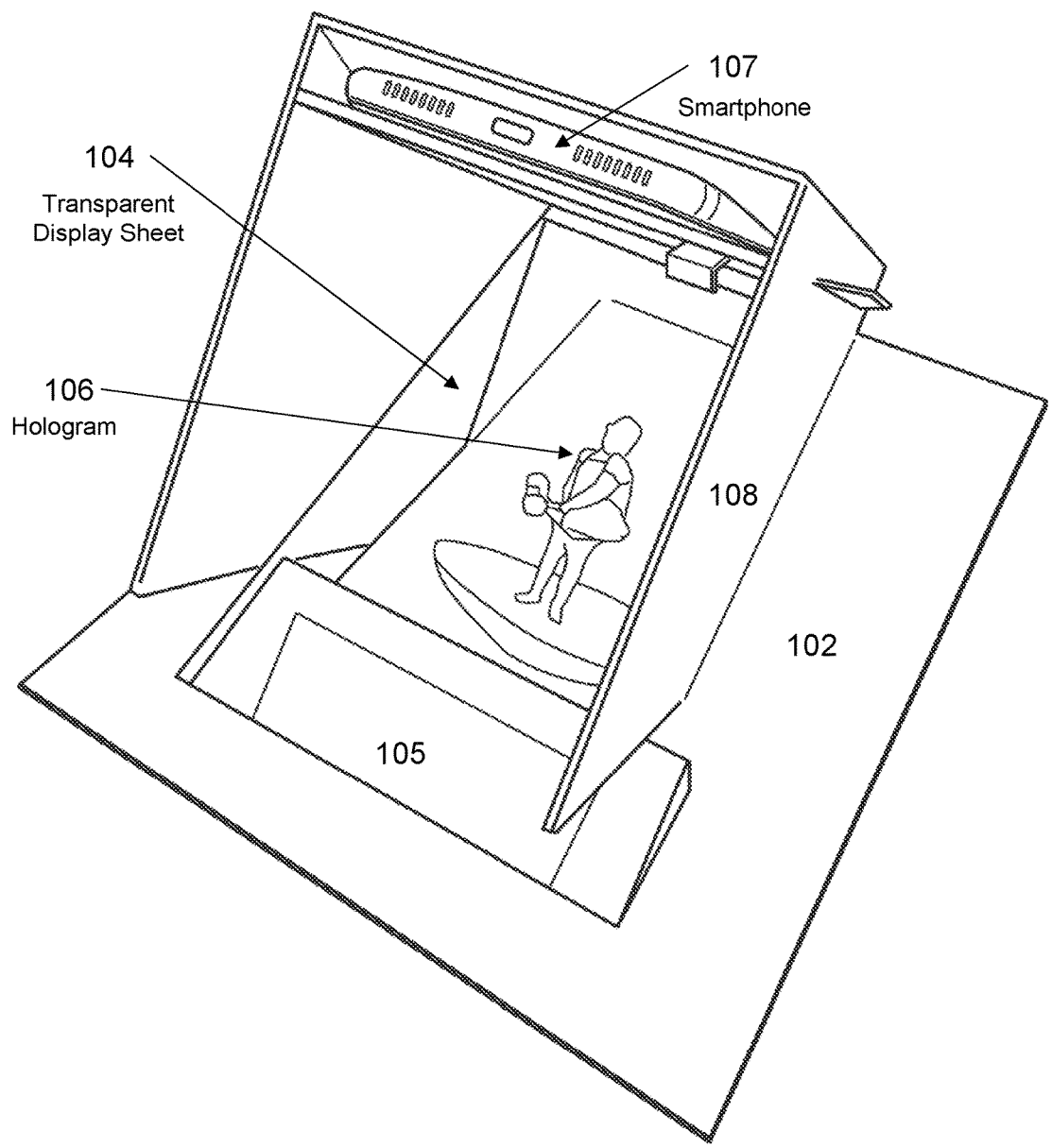
FIG. 1B shows an application view of the detachable holographic display apparatus made from a cardboard (i.e. "Holo Cardboard Plus") for a portable electronic device, in accordance with an embodiment of the invention.

FIG. 1B shows an application view (100B) of the detachable holographic display apparatus made from the same cardboard (i.e. "Holo Cardboard Plus") for the portable electronic device. As shown in this application view (100B), the smartphone (107) or another portable electronic device is slotted into the upper shelf of the apparatus, and is configured to orient its display screen to face downward. The downward orientation of the smartphone display screen enables a displayed image from the smartphone (107) to project through the smartphone holder (i.e. 103 of FIG. 1A) and the transparent sheet (i.e. 101 of FIG. 1A) for the smartphone holder. This projected image from the smartphone (107) is partially refracted and reflected by the transparent display sheet (104) angled at approximately 45-degrees relative to the smartphone display screen to form a hologram (106) of the projected image, as shown in the application view (100B) of FIG. 1B.

Figure 2:
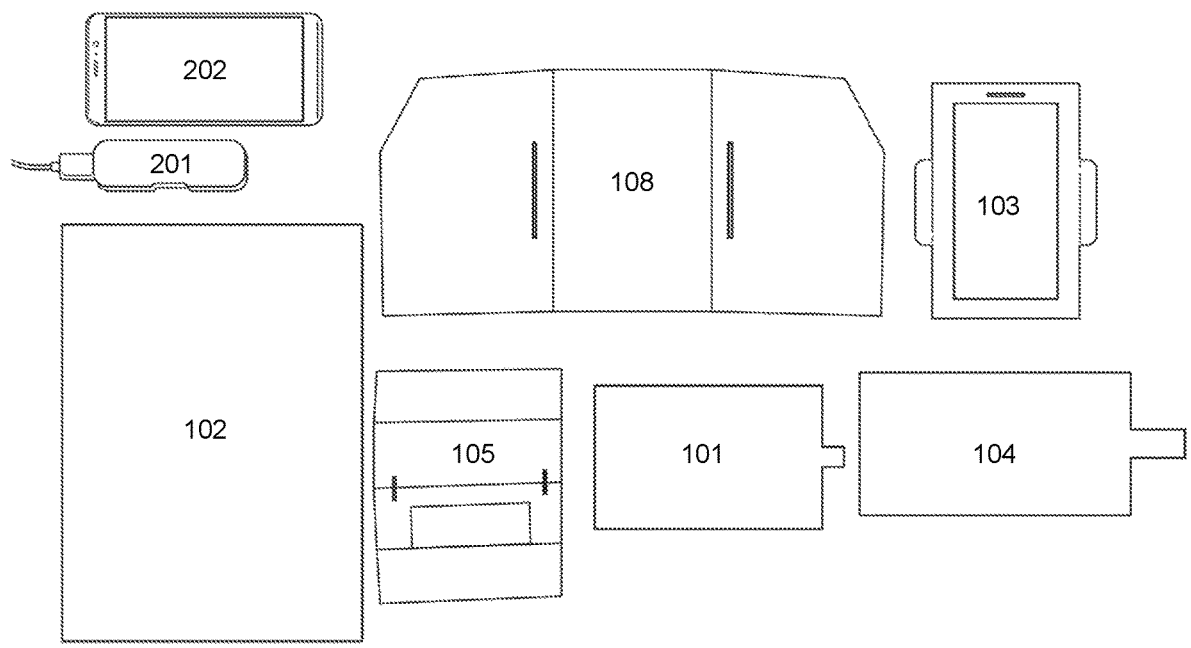
FIG. 2 shows an individual component diagram for the detachable holographic display apparatus made from a cardboard (i.e. "Holo Cardboard Plus") for a portable electronic device, in accordance with an embodiment of the invention.

In the preferred embodiment of the invention, the detachable holographic display apparatus of FIG. 1B also incorporates a top and sidewall casing (108), interchangeably called herein as the "main body," which may be a single piece of cardboard that can be folded in two sections to create a top casing and left and right sidewalls, as additionally illustrated by the top and sidewall casing (108) in FIG. 2. In other embodiments, the top and sidewall casing (108) may be separate pieces that are connected together to constitute the top casing and the two sidewalls for the apparatus. Furthermore, as described and illustrated previously in FIG. 1A, the detachable holographic display apparatus also includes the rear wall (102), the transparent display sheet (104) angled at 45 degrees or at another desired angle relative to the ground, the portable electronic device display screen, or another flat surface, and the stand (105), which is configured to ensure the lower portion of the transparent display sheet (104) to maintain the desired angle within the apparatus.

FIG. 2 shows an individual component diagram (200) for the detachable holographic display apparatus made from the same cardboard (i.e. "Holo Cardboard Plus") for the portable electronic device. As shown in this individual component diagram (200), the detachable holographic display apparatus prior to assembly comprises the smartphone holder (103), which constitutes the upper shelf of the apparatus, the transparent sheet (101) for the smartphone holder (103), and the top and sidewall casing (108) that can be folded along two segments to create the two sidewalls and the top casing.

The detachable holographic display apparatus prior to assembly also includes the transparent display sheet (104) configured to be angled at 45 degrees relative to the portable electronic device display screen, the stand (105) that holds the transparent display sheet (104) at a desired angle, and the rear wall (102) that provides an additional physical space to enable a physical depth perception (i.e. z-axis) for the hologram (e.g. 106 of FIG. 2) transformed from the flat display screen of the portable electronic device. Furthermore, in the preferred embodiment of the invention, the detachable holographic display apparatus is configured to operate with the portable electronic device (202), which may be a smartphone (e.g. 107 of FIG. 1B), a tablet computer, or another portable electronic device with a display screen. Optionally, the detachable holographic display apparatus is configured to operate with a hand and/or finger gesture detection interface (201) to control holograms formed on or near the transparent display sheet (104).

Figure 3:
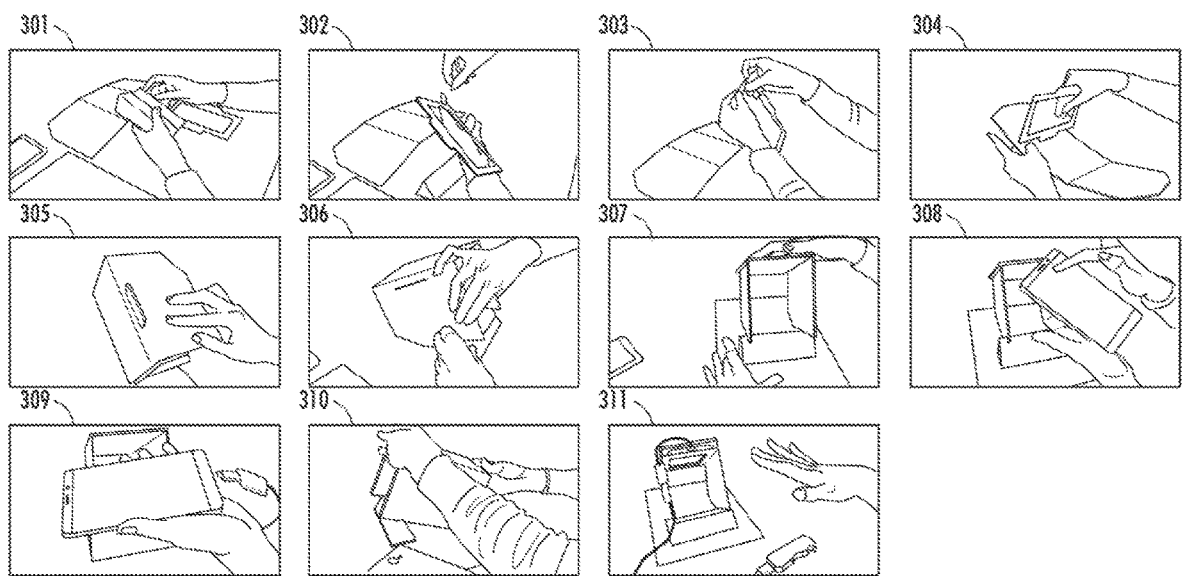
FIG. 3 shows an assembly sequence diagram for the detachable holographic display apparatus made from a cardboard (i.e. "Holo Cardboard Plus") for a portable electronic device, in accordance with one or more embodiments of the invention.

FIG. 3 shows an assembly sequence diagram (300) for the detachable holographic display apparatus made from the same cardboard (i.e. "Holo Cardboard Plus") for the portable electronic device. As shown in the numerous steps (STEPs 301-311) in this assembly sequence diagram (300), the stand (e.g. 105 in FIG. 1A) is folded into shape in STEP 301, followed by the smartphone holder (e.g. 103 in FIG. 1A) construction with the transparent sheet (e.g. 101 in FIG. 1A), and the top and sidewall casing (e.g. 108 in FIG. 1B) assembly with the transparent display sheet (e.g. 104 in FIG. 1A) in subsequent steps (STEPs 302, 303, 304, 305, and 306).

Then, the assembled upper shelf and the top and sidewall casing are attached to the stand (e.g. 105 in FIG. 1A) and the rear wall (e.g. 102 in FIG. 1A) in STEP 307, after which the display screen of the smartphone is oriented to face downward and slotted into the upper shelf of the apparatus, as shown in STEPs 308, 309, and 310. Optionally, the smartphone may also be connected to a power adapter, as shown in STEP 309, and further be connected to the hand and/or finger gesture detection interface (e.g. 201 in FIG. 2) to control projected holograms, as shown in STEP 311.

Figure 4A:
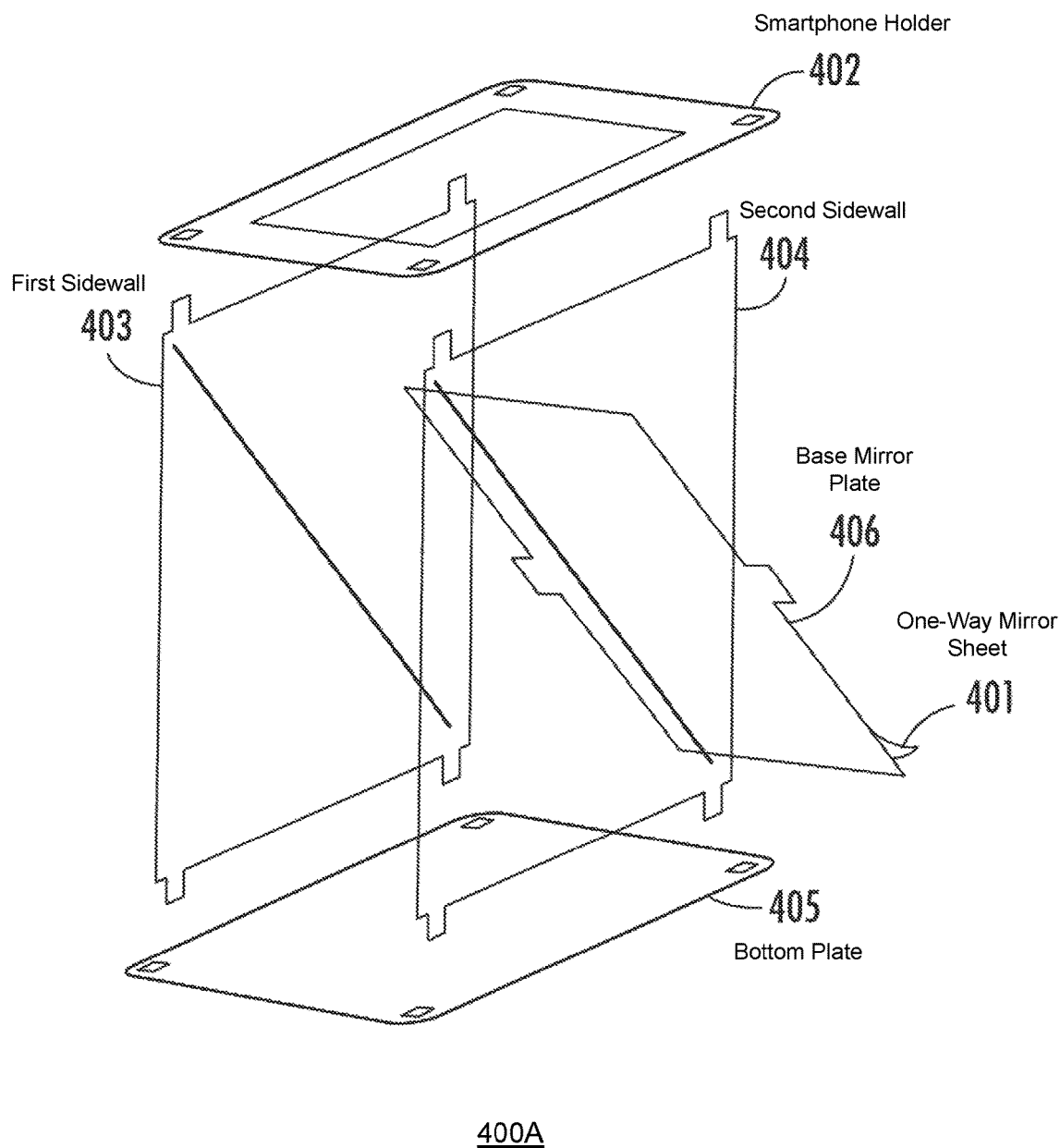
FIG. 4A shows a detachable holographic display apparatus made from a cardboard (i.e. "Holo Cardboard 01") for a portable electronic device, in accordance with an embodiment of the invention.

In another embodiment of the invention, FIG. 4A shows a detachable holographic display apparatus (400A) made from a cardboard (i.e. "Holo Cardboard 01") for a portable electronic device. The detachable holographic display apparatus (400A) in this embodiment, as illustrated in FIGS. 4A-4C, FIG. 5, and FIG. 6, comprises a smartphone holder (402) to hold the portable electronic device with its display facing down, when the apparatus is fully constructed. In the preferred embodiment of the invention, the smartphone holder (402) may contain a surrounding frame and a rectangular void (i.e. a rectangular center opening) through which the smart phone display screen can project its image below. In alternate embodiments of the invention, the exterior edges of the smartphone holder (402) may encapsulate a transparent acrylic or glass sheet instead of containing the void. Furthermore, in some embodiments, the smartphone holder (402) may be constructed as a shelf that can securely slot the smartphone or another portable electronic device into the shelf, similar to the configuration previously illustrated as elements 101 and 103 in FIG. 1A.

The detachable holographic display apparatus (400A) also includes a first sidewall (403), a second sidewall (404), and a bottom plate (405) that can be assembled together with the smartphone holder (402) to constitute a base casing of the apparatus. Importantly, in this embodiment of the invention, a one-way mirror sheet (401) attached to a base mirror plate (406) is utilized instead of a transparent display sheet (e.g. 104 in FIG. 1A) to enable holographic display. As shown in FIG. 4A, the one-way mirror sheet (401) attached to the base mirror plate (406) is diagonally angled at 45 degrees inside the apparatus casing, or at another desired angle relative to the ground, the portable electronic device display screen, or another flat surface. Furthermore, in the preferred embodiment of the invention, the side tabs protruding from the base mirror plate (406) are configured to be slotted into corresponding slits on the first sidewall (403) and the second sidewall (404) for a secured and angled attachment to the base casing.

The secured and angled attachment of the base mirror plate (406) provides the desired angle (e.g. 45 degrees) for real depth axis-based display of three-dimensional holograms. When the detachable holographic display apparatus (400A) is fully assembled, a smartphone or another portable electronic device can be positioned on top of the smartphone holder (402), with its display screen facing down. Then, the portable electronic device can display an image on its display screen, and this image is subsequently refracted and/or reflected on the one-way mirror sheet (401) at approximately 45 degrees relative to the display screen of the portable electronic device to produce a corresponding 3D hologram (e.g. 407 in FIG. 4B) of the image.

Preferably, the 45-degree angled space near the one-way mirror sheet (401) attached to the base mirror plate (406) serves as an additional physical space that accommodates a physical depth perception (i.e. z-axis) for the hologram (e.g. 407 of FIG. 4B) transformed from the flat display screen of the portable electronic device. Furthermore, the one-way mirror sheet (401) may be made of aluminum, silver, or another reflective material suitable as a mirror. Moreover, in an alternate embodiment of the invention, the detachable holographic display apparatus (400A) may be made of plastic, rubber, metallic alloy, or a combination thereof, instead of cardboard materials.

Figure 4B:
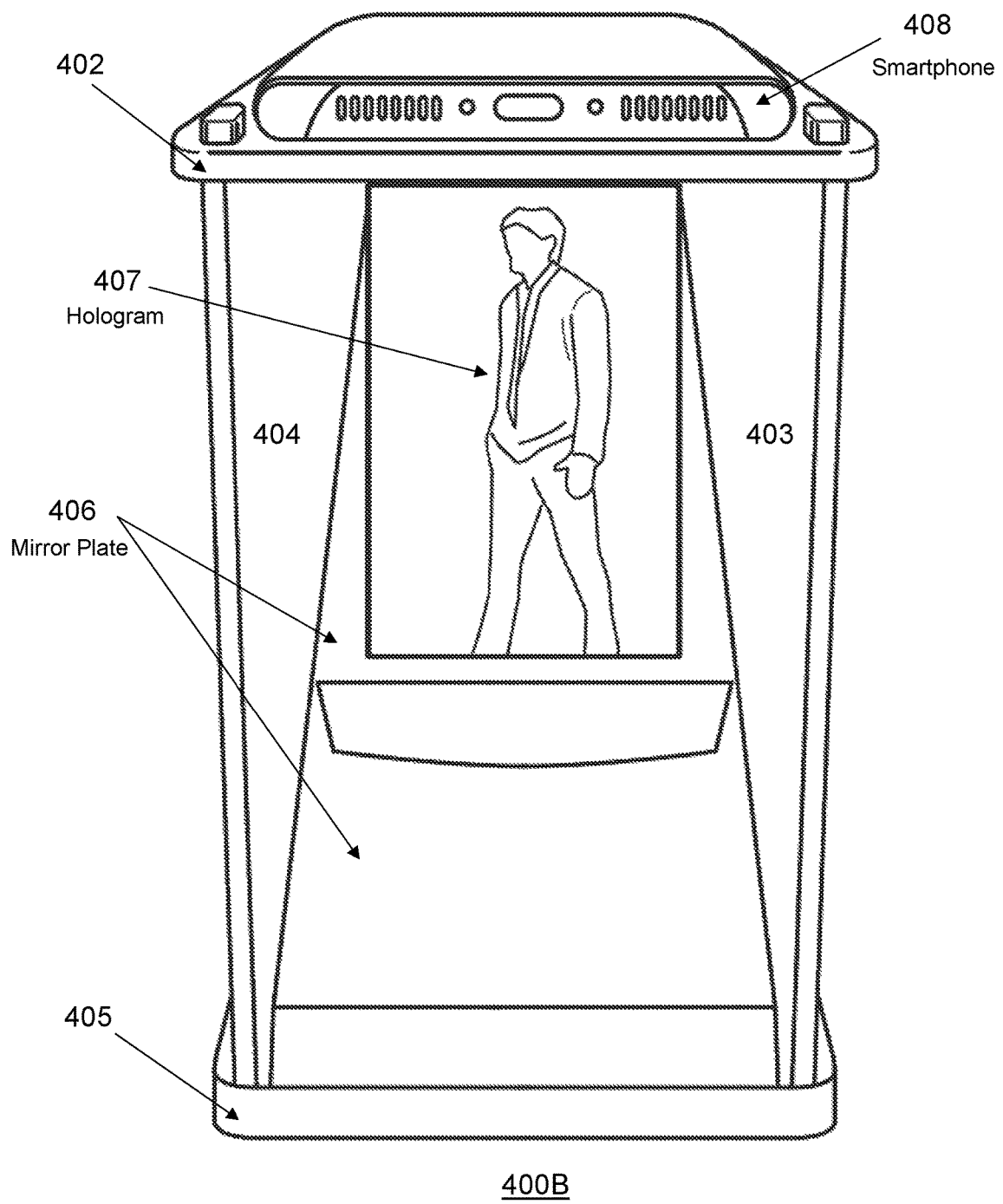
FIG. 4B shows a frontal application view of the detachable holographic display apparatus made from a cardboard (i.e. "Holo Cardboard 01") for a portable electronic device, in accordance with an embodiment of the invention.
Figure 4C:
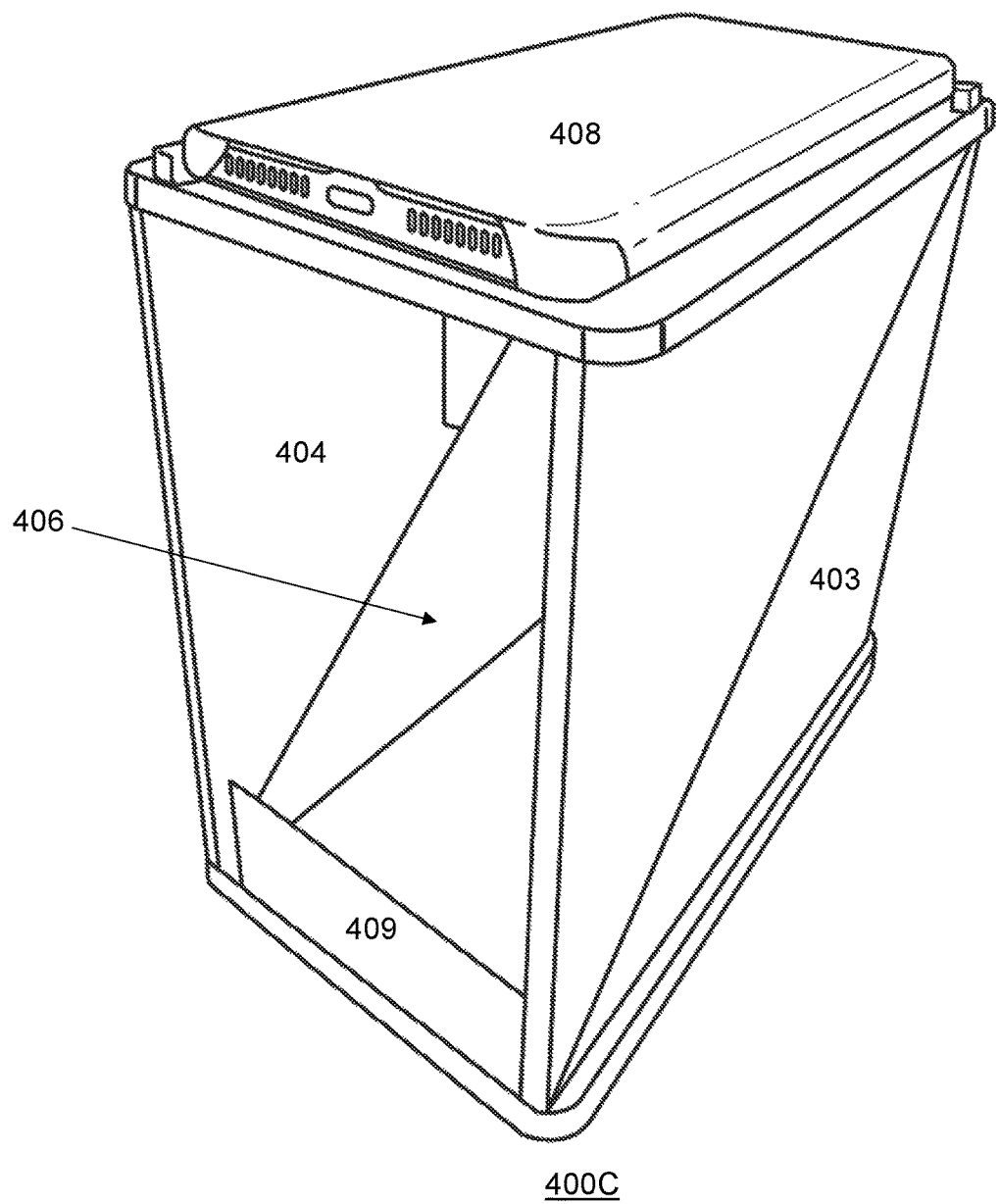
FIG. 4C shows a perspective application view of the detachable holographic display apparatus made from a cardboard (i.e. "Holo Cardboard 01") for a portable electronic device, in accordance with an embodiment of the invention.

FIG. 4B shows a frontal application view (400B) of the detachable holographic display apparatus made from the same cardboard (i.e. "Holo Cardboard 01") for the portable electronic device. Furthermore, FIG. 4C shows a perspective application view (400C) of the detachable holographic display apparatus made from a cardboard (i.e. "Holo Cardboard 01") for a portable electronic device, in accordance with an embodiment of the invention. As shown in both of these application views (400B, 400C), the smartphone (408) or another portable electronic device is placed on top of the smartphone holder (402), and is configured to orient its display screen to face downward.

The downward orientation of the smartphone display screen enables a displayed image from the smartphone (408) to project through the void in the smartphone holder (402). This projected image from the smartphone (408) is partially reflected and/or refracted at an approximately 45-degree angle between the smartphone display screen and the one-way mirror sheet (401) attached to the base mirror plate (406) to form a hologram (407) of the projected image, as shown in the frontal application view (400B) of FIG. 4B. In the preferred embodiment of the invention, this detachable holographic display apparatus also incorporates the first sidewall (403), the second sidewall (404), and the bottom plate (405) that can be assembled together with the smartphone holder (402) to constitute the base casing of the apparatus. In addition, as shown by the perspective application view (400C) in FIG. 4C, a stand (409) can be inserted into the frontal portion of the base casing of the apparatus to further secure or affix the base mirror plate (406).

Figure 5:
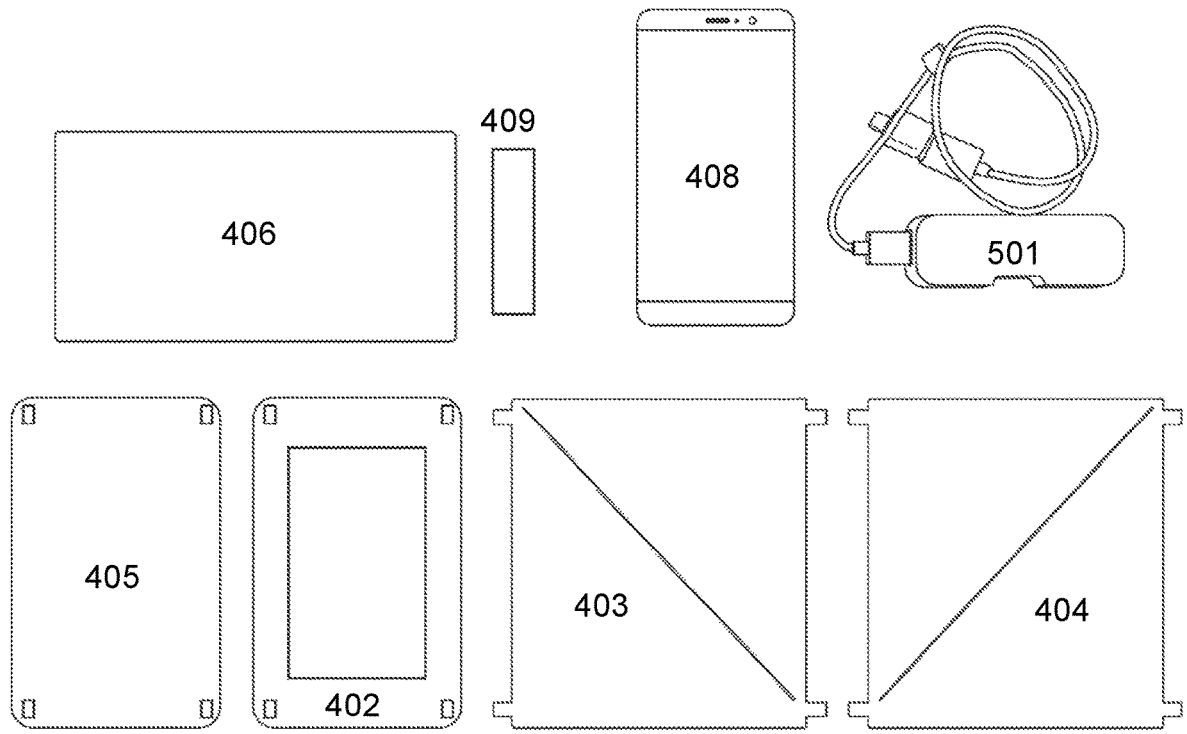
FIG. 5 shows an individual component diagram for the detachable holographic display apparatus made from a cardboard (i.e. "Holo Cardboard 01") for a portable electronic device, in accordance with an embodiment of the invention.

FIG. 5 shows an individual component diagram (500) for the detachable holographic display apparatus made from the same cardboard (i.e. "Holo Cardboard 01") for the portable electronic device. As shown in this individual component diagram (500), this particular detachable holographic display apparatus prior to assembly comprises the smartphone holder (402), which constitutes the roof of the apparatus, the first sidewall (403), the second sidewall (404), the bottom plate (405), the base mirror plate (406) attached with the one-way mirror sheet (e.g. 401 in FIG. 4A), and the stand (409).

When assembled, the base mirror plate (406) is angled at approximately 45 degrees relative to the portable electronic device display screen, and the stand (405) and the two sidewalls (403, 404) securely hold the base mirror plate (406) at the desired angle. Furthermore, in the preferred embodiment of the invention, the detachable holographic display apparatus is configured to operate with a portable electronic device, such as the smartphone (e.g. 408 in FIG. 4B and FIG. 4C), a tablet computer, or another portable electronic device with a display screen. Optionally, the detachable holographic display apparatus is configured to operate with a hand and/or finger gesture detection interface (501) to control holograms formed on or near the base mirror plate (406).

Figure 6:
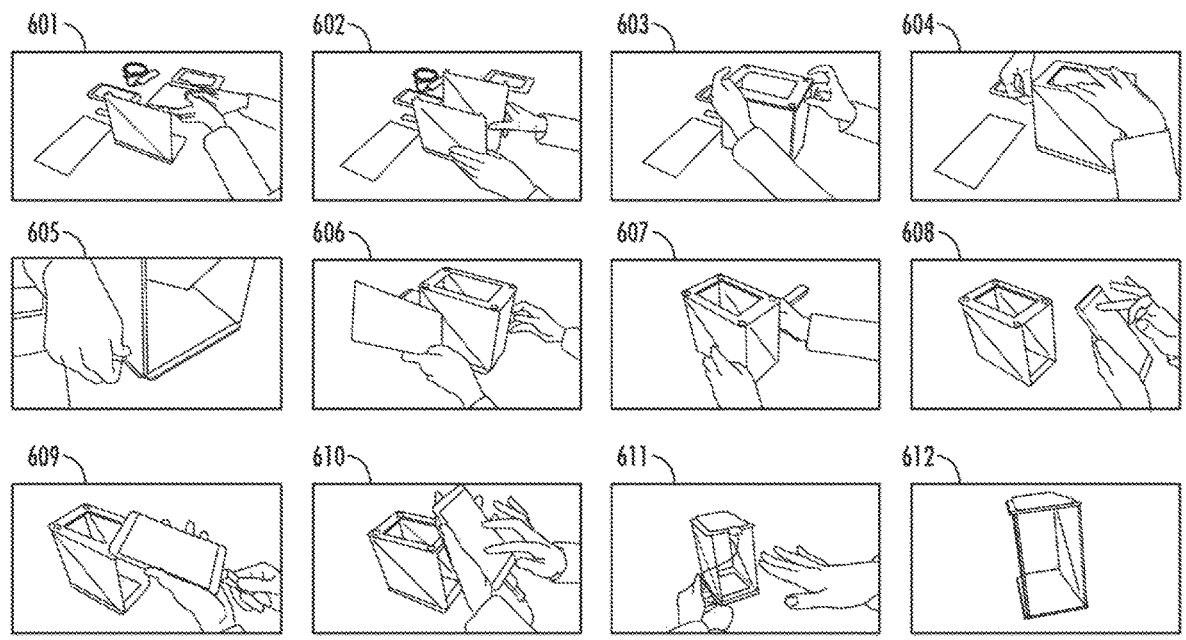
FIG. 6 shows an assembly sequence diagram for the detachable holographic display apparatus made from a cardboard (i.e. "Holo Cardboard 01") for a portable electronic device, in accordance with one or more embodiments of the invention.

FIG. 6 shows an assembly sequence diagram (600) for the detachable holographic display apparatus made from the same cardboard (i.e. "Holo Cardboard 01") for a portable electronic device. As shown in the numerous steps (STEPs 601-612) in this assembly sequence diagram (600), the base casing is constructed by attaching the bottom plate (e.g. 405 in FIG. 4A), the two sidewalls (e.g. 403 and 404 in FIG. 4A), and the smartphone holder (e.g. 402 in FIG. 4A) together, as demonstrated by STEPs 601, 602, and 603. Then, the base mirror plate with the one-way mirror sheet (e.g. 406 and 401 in FIG. 4A) is inserted into the assembled base casing, as shown in STEPs 604, 605, 606, and 607.

Subsequently, the smartphone is plugged into a power adapter and prepared to display images in STEPs 608, 609, and 610, and placed with its display screen facing down on the smartphone holder (e.g. 402 in FIG. 4A), as shown in STEPs 611 and 612. Optionally, the smartphone may also be connected to the hand and/or finger gesture detection interface (e.g. 501 in FIG. 5) to control projected holograms.

Figure 7A:
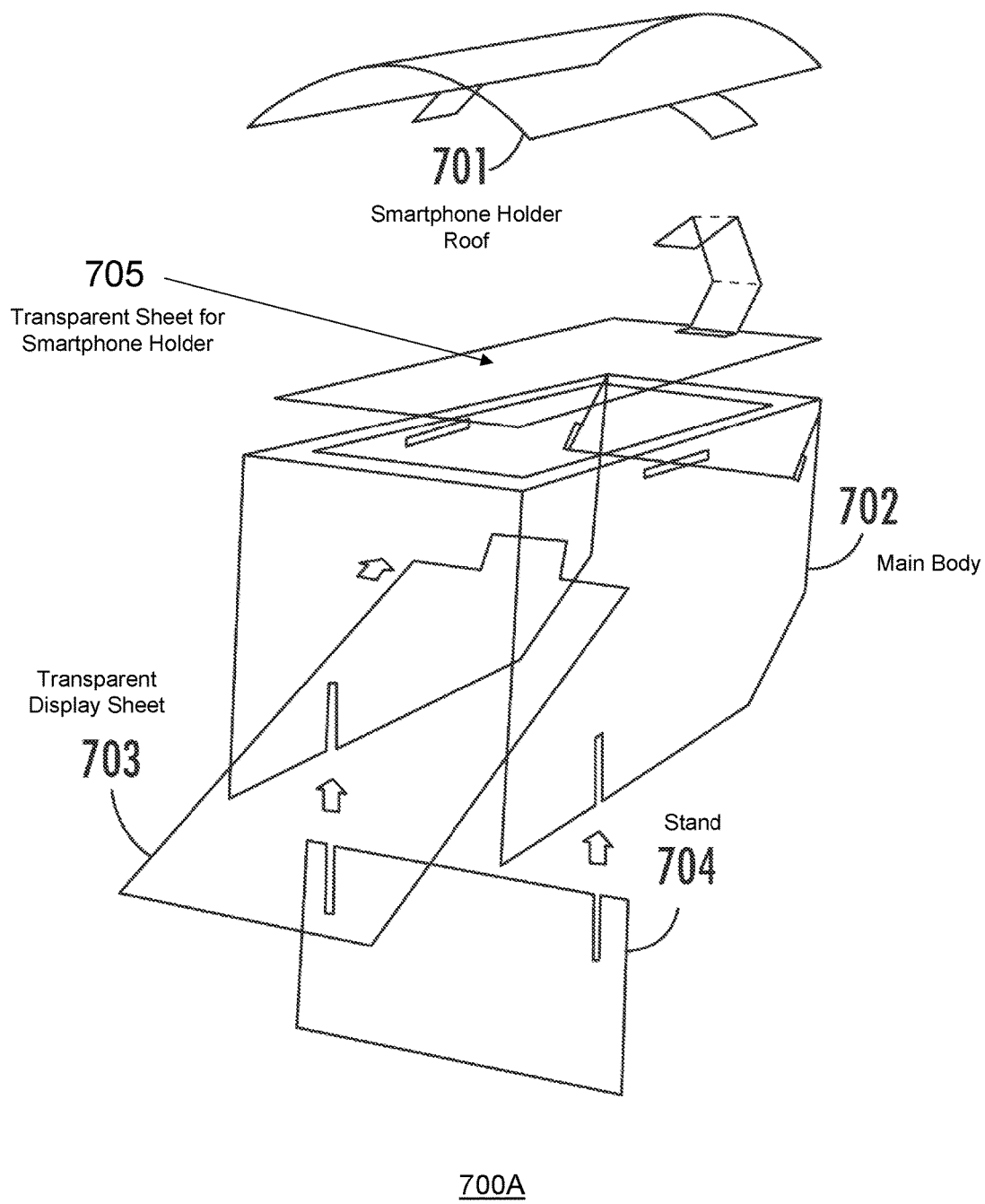
FIG. 7A shows a detachable holographic display apparatus made from a cardboard (i.e. "Holo Cardboard 02") for a portable electronic device, in accordance with an embodiment of the invention.

Yet in another embodiment of the invention, FIG. 7A shows a detachable holographic display apparatus (700A) made from a cardboard (i.e. "Holo Cardboard 02") for a portable electronic device. As shown in FIG. 7A, the detachable holographic display apparatus (700A) comprises a transparent sheet (705) configured to be encapsulated or surrounded by a smartphone holder roof (701), which serves as an arched top cover and an upper shelf of the apparatus to hold the portable electronic device with its display facing down, when the apparatus is fully constructed. In this embodiment of the invention, the arched top cover accommodates both thin and thick portable electronic devices more flexibly, compared to a rectangular shelf, and may also be simpler and/or cheaper to construct than alternate designs involving the rectangular shelf, because the smartphone holder roof (701) in FIG. 7A is not required to be rigid to support the weight of a portable electronic device.

The detachable holographic display apparatus (700A) also includes a main body (702), a transparent display sheet (703) diagonally angled at 45 degrees inside the main body (702), or at another desired angle relative to the ground, the portable electronic device display screen, or another flat surface, and a stand (704) configured to ensure a lower portion of the transparent display sheet (703) to maintain the desired angle within the apparatus. Furthermore, as shown in FIG. 7A, an upper portion of the transparent display sheet (703) can incorporate a tab that can be inserted into a slot on a surface of the main body (702) to provide the desired angle (e.g. 45 degrees) for real depth axis-based display of three-dimensional holograms. When the detachable holographic display apparatus (700A) is fully assembled, a smartphone or another portable electronic device can be slotted into the upper shelf with its display screen facing down. Then, the portable electronic device can display an image on its display screen, and this image is subsequently refracted and/or reflected on the transparent display sheet (703) at approximately 45 degrees relative to the display screen of the portable electronic device to produce a corresponding 3D hologram (e.g. 706 in FIG. 7B) of the image.

In the preferred embodiment of the invention, the backspace between the rear face of the transparent display sheet (703) and the main body (702) of the detachable holographic display apparatus (700A) provides an additional physical space that accommodates a physical depth perception (i.e. z-axis) for the hologram (e.g. 706 of FIG. 7B) transformed from the flat display screen of the portable electronic device. Furthermore, the upper edges of the main body (702) function as a smartphone holder frame, and is configured to support and/or surround the transparent sheet (705), while also providing slots to insert side tabs protruding from the smartphone holder roof (701). When the side tabs of the smartphone holder roof (701) are inserted into the corresponding slots on the sidewalls of the main body (702), the smartphone holder roof (701) and the transparent sheet (705) are securely held by the main body (702) of the detachable holographic display apparatus (700A), as shown in FIG. 7A.

Continuing with the embodiment of the invention as illustrated in FIG. 7A, the transparent sheet (705) below the smartphone holder roof (701) and the transparent display sheet (703) for displaying holograms may be made of transparent acrylic, plastic, or glass materials. Moreover, in an alternate embodiment of the invention, the detachable holographic display apparatus (700A) may be made of plastic, rubber, metallic alloy, or a combination thereof, instead of cardboard materials. Furthermore, in some embodiments of the invention, the detachable holographic display apparatus (700A) may not include and/or utilize the transparent sheet (705) below the smartphone holder roof (701), and instead maintain a void below the smartphone holder roof (701) to enable its display screen to project onto the transparent display sheet (703) directly through the void.

Figure 7B:
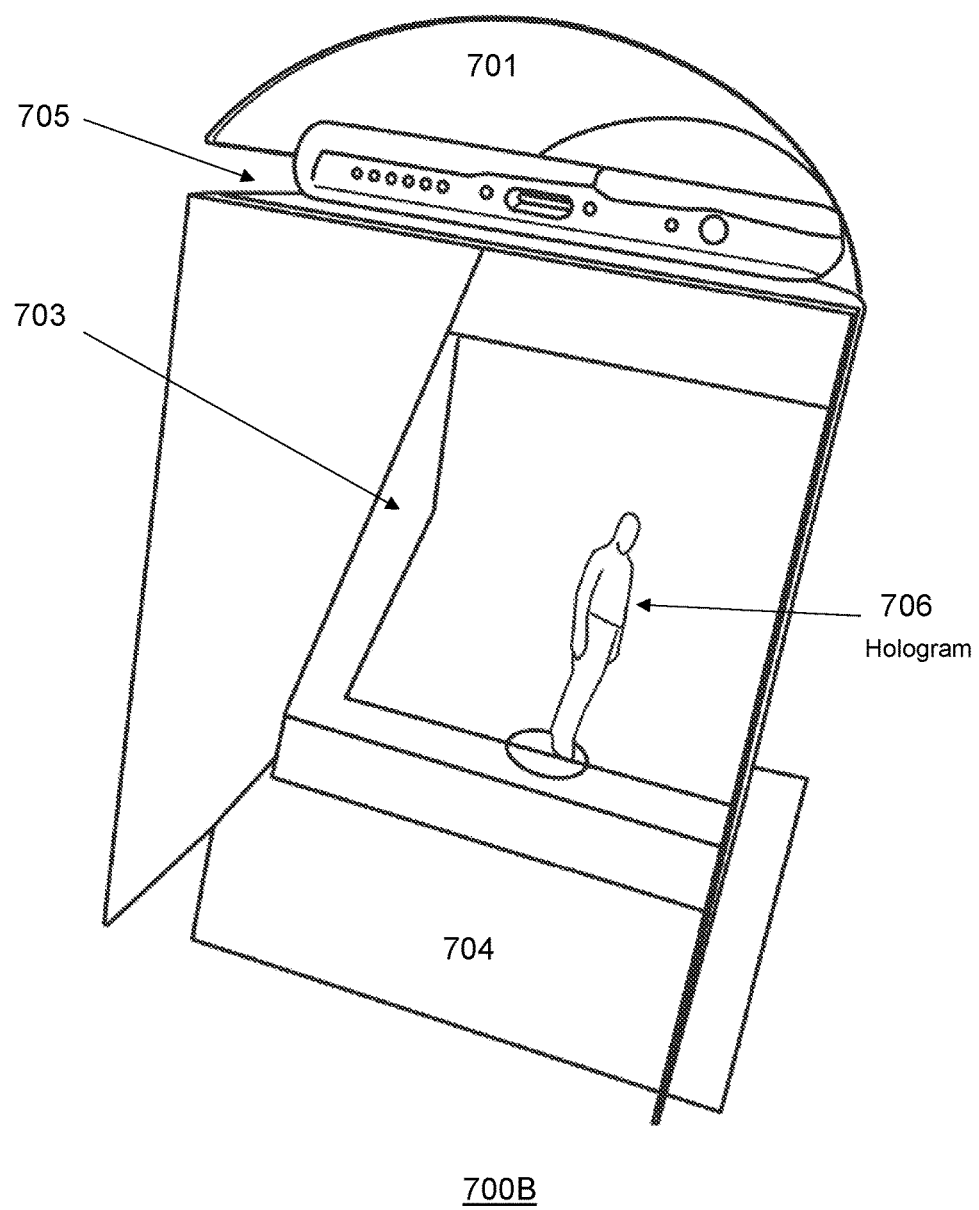
FIG. 7B shows an application view of the detachable holographic display apparatus made from a cardboard (i.e. "Holo Cardboard 02") for a portable electronic device, in accordance with an embodiment of the invention.

FIG. 7B shows an application view (700B) of the detachable holographic display apparatus made from the same cardboard (i.e. "Holo Cardboard 02") for the portable electronic device. As shown in this application view (700B), a smartphone or another portable electronic device is slotted into the upper shelf of the apparatus formed by the upper edges of the main body (702), the transparent sheet (705), and the smartphone holder roof (701), and is configured to orient its display screen to face downward. The downward orientation of the smartphone display screen enables a displayed image from the smartphone to project through the transparent sheet (705) in the upper shelf. This projected image from the smartphone is partially refracted and reflected by the transparent display sheet (703) angled at approximately 45-degrees relative to the smartphone display screen to form a hologram (706) of the projected image, as shown in the application view (700B) of FIG. 7B.

Figure 8:
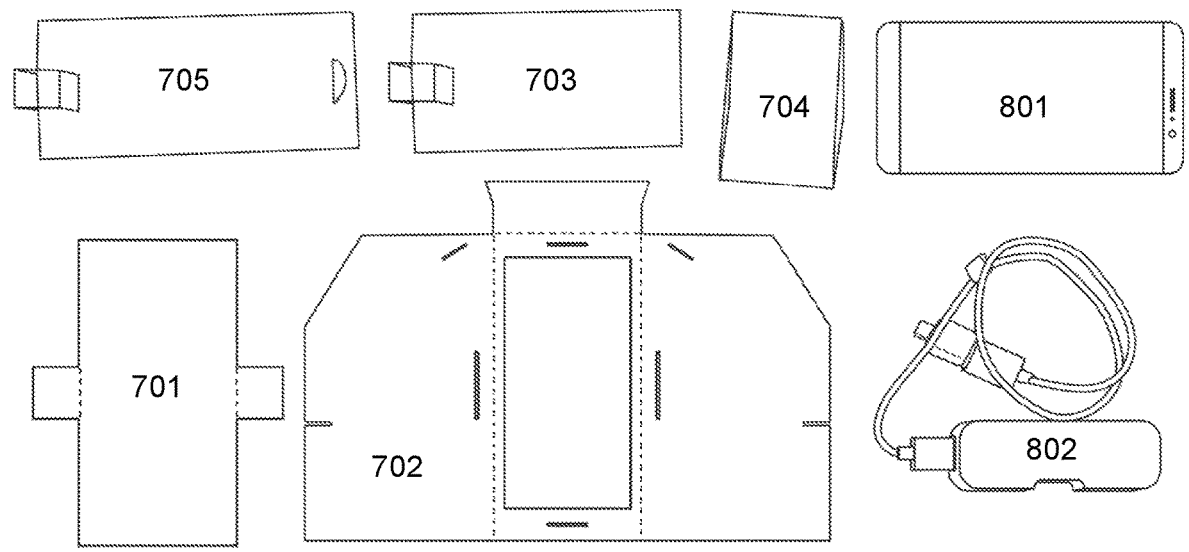
FIG. 8 shows an individual component diagram for the detachable holographic display apparatus made from a cardboard (i.e. "Holo Cardboard 02") for a portable electronic device, in accordance with an embodiment of the invention.

In the preferred embodiment of the invention, the main body (i.e. 702 of FIG. 7A) of the detachable holographic display apparatus may be a single piece of cardboard that can be folded in two sections to create a top casing (i.e. the upper edges of the main body) and left and right sidewalls, as additionally illustrated by the pre-assembled main body (702) in FIG. 8. In other embodiments, the main body of the detachable holographic display apparatus may be separate pieces that are connected together to constitute the top casing and the two sidewalls for the apparatus.

Furthermore, FIG. 8 shows an individual component diagram (800) for the detachable holographic display apparatus made from the same cardboard (i.e. "Holo Cardboard 02") for the portable electronic device. As shown in this individual component diagram (800), the detachable holographic display apparatus prior to assembly comprises the smartphone holder roof (701), which constitutes the roof of the upper shelf of the apparatus, the transparent sheet (705) designed to be positioned above the upper edges of the main body (702) to form a smart phone insert slot, and the main body (702) that can be folded along two segments to create the two sidewalls and the upper edges of the main body.

The detachable holographic display apparatus prior to assembly also includes the transparent display sheet (703) configured to be angled at 45 degrees relative to the portable electronic device display screen, the stand (704) that holds the transparent display sheet (703) at a desired angle. In this configuration, the main body (702), when folded and assembled, provides an additional physical space to enable a physical depth perception (i.e. z-axis) for the hologram (e.g. 706 of FIG. 7B) transformed from the flat display screen of the portable electronic device. Furthermore, in the preferred embodiment of the invention, the detachable holographic display apparatus is configured to operate with the portable electronic device (801), which may be a smartphone, a tablet computer, or another portable electronic device with a display screen. Optionally, the detachable holographic display apparatus is also configured to operate with a hand and/or finger gesture detection interface (801) to control holograms formed on or near the transparent display sheet (703).

Figure 9:
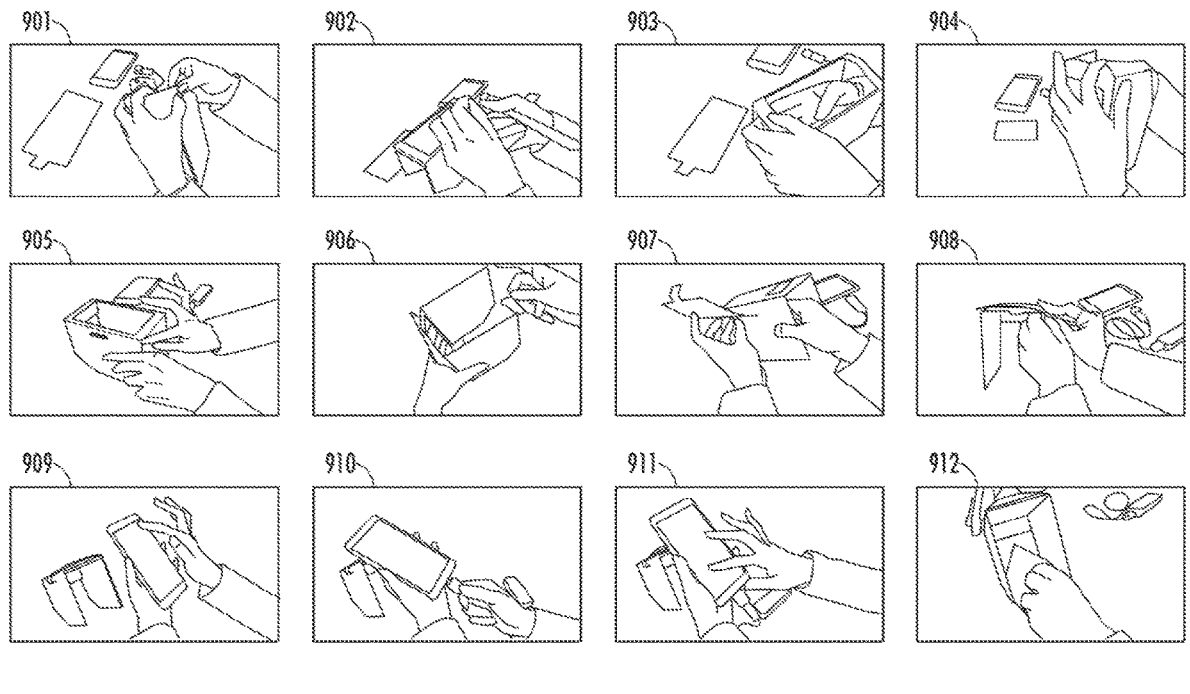
FIG. 9 shows an assembly sequence diagram for the detachable holographic display apparatus made from a cardboard (i.e. "Holo Cardboard 02") for a portable electronic device, in accordance with one or more embodiments of the invention.

Moreover, FIG. 9 shows an assembly sequence diagram (900) for the detachable holographic display apparatus made from the same cardboard (i.e. "Holo Cardboard 02") for the portable electronic device. As shown in the numerous steps (STEPs 901-912) in this assembly sequence diagram (900), the main body (e.g. 702 in FIG. 7A) is folded into shape in STEPs 901 and 902, and the transparent display sheet (e.g. 703 in FIG. 7A) is inserted into the folded main body in STEPs 903 and 904. Then, the smartphone holder roof (e.g. 701 in FIG. 7A) is attached to the upper edges of the folded main body in STEPs 905 and 906, followed by insertion of the transparent sheet (e.g. 705 in FIG. 7A) into the upper shelf area of the apparatus, as shown in STEPs 907 and 908 in FIG. 9.

Then, the assembled upper shelf and the main body are attached to the stand (e.g. 704 in FIG. 7A), after which the display screen of the smartphone is plugged into an external power source and optionally connected to the hand and/or finger gesture detection interface (e.g. 802 in FIG. 8) to control projected holograms, as shown in STEPs 909, 910, 911, and 912. The smartphone can then be slotted into the upper shelf of the apparatus to utilize the detachable holographic display apparatus, as embodied in FIGS. 7A, 7B, 8, and 9.

For the embodiments of the invention illustrated in FIGS. 1A-9, the cardboard-based detachable holographic display apparatus is configured to dock a portable electronic device on an upper shelf with its display screen facing downward towards an angled transparent sheet or an angled mirrored sheet, which provides a refractive and/or reflective holographic 3D image of an image displayed on the flat display screen of the portable electronic device. Preferably, the angle of the transparent sheet or the mirrored sheet is approximately 45 degrees relative to the flat display screen of the portable electronic device, and the back of the cardboard-based detachable holographic display apparatus provides an additional physical space behind the angled transparent sheet or the angled mirrored sheet, wherein the additional physical space is contained by the cardboard in part for generating and maintaining a physical depth perception (i.e. z-axis) for the refractive and/or reflective holographic 3D image transformed from the flat display screen of the portable electronic device.

Figure 10A:
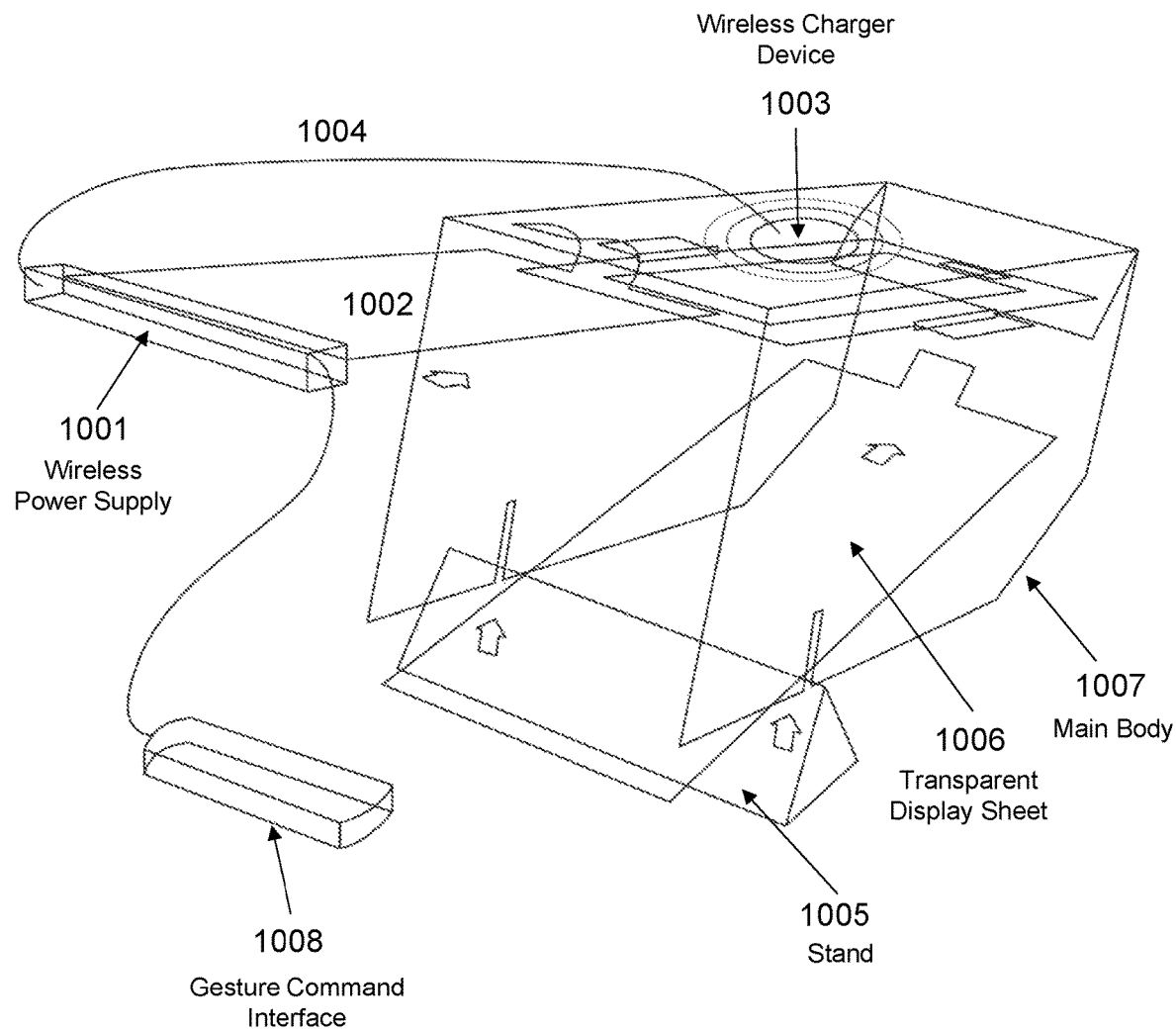
FIG. 10A shows a detachable holographic display apparatus integrating a wireless charger and a gesture interface (i.e. "HoloTube Lite Plus") for a portable electronic device, in accordance with one or more embodiments of the invention.
Figure 10B:
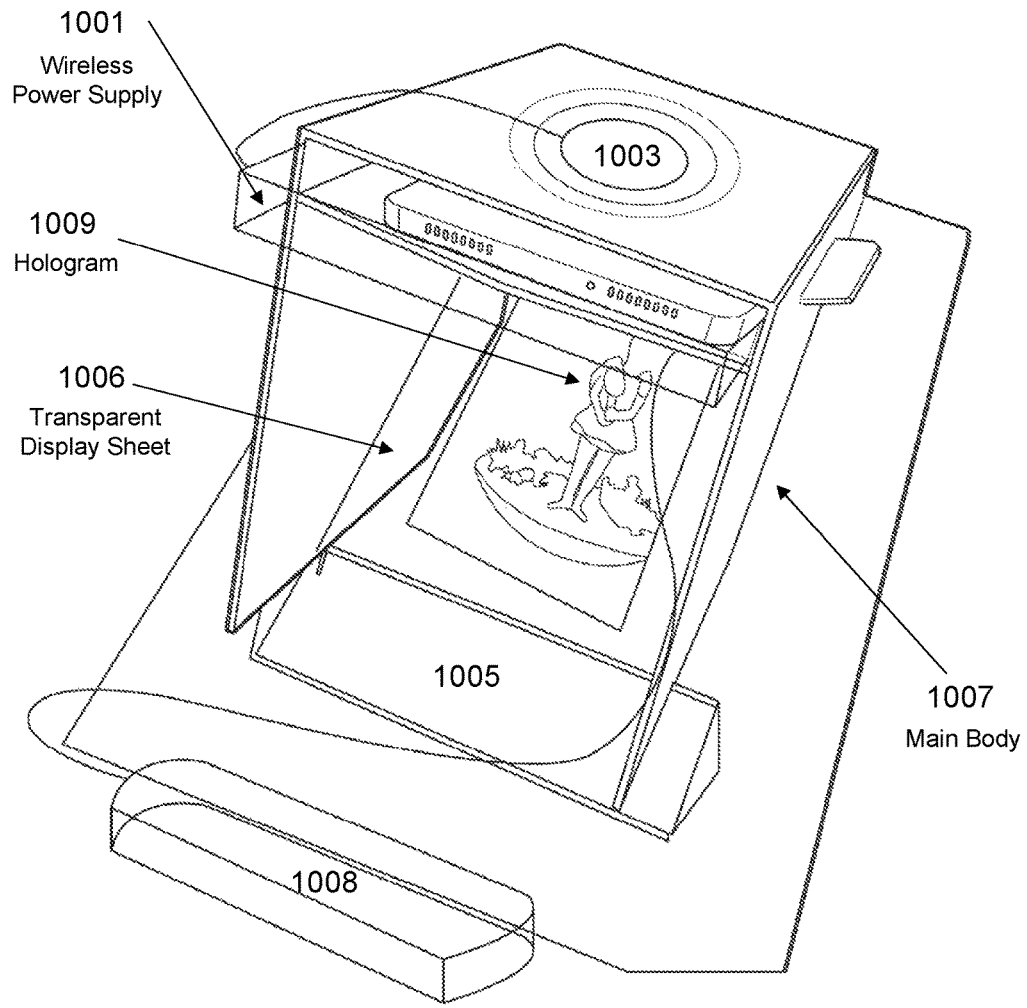
FIG. 10B shows a fully-installed application view of the detachable holographic display apparatus integrating a wireless charger and a gesture interface (i.e. "HoloTube Lite Plus") for a portable electronic device, in accordance with one or more embodiments of the invention.

Yet in another embodiment of the invention, FIG. 10A shows a detachable holographic display apparatus (1000A) integrating a wireless charger device (1003), a wireless power supply (1001), and a gesture recognition interface unit (1008) for a portable electronic device. Furthermore, FIG. 10B shows a fully-installed application view (1000B) of the same detachable holographic display apparatus integrating the wireless charger and the gesture recognition interface for the portable electronic device. This embodiment of the detachable holographic display apparatus (1000A) also incorporates a transparent sheet (1002) as part of an upper shelf that functions as a smartphone holder with a rectangular center opening. The transparent sheet (1002) may be also connected to the wireless power supply (1001) and positioned on top of the upper edges of a main body (1007) of the detachable holographic display apparatus (1000A), as shown in FIG. 10A.

Preferably, the wireless power supply (1001) is operatively and electrically connected to the wireless charger device (1003) through an electrical wire (1004), all of which are encapsulated within the upper shelf of the detachable holographic display apparatus (1000A) along with the transparent sheet (1002), as shown in FIG. 10A. The detachable holographic display apparatus (1000A) also includes a transparent display sheet (1006) angled at 45 degrees or at another desired angle relative to the ground, the portable electronic device display screen, or another flat surface, and a stand (1005) configured to ensure a lower portion of the transparent display sheet (1006) to maintain the desired angle within the apparatus.

Furthermore, as shown in FIG. 10A, an upper portion of the transparent display sheet (1006) can incorporate a tab that can be inserted into a slot on an edge of the smartphone holder to provide the desired angle (e.g. 45 degrees) for real depth axis-based display of three-dimensional holograms. When the detachable holographic display apparatus (1000A) is fully assembled, a smartphone or another portable electronic device can be slotted into the upper shelf with its display screen facing down. If the transparent sheet (1002) is installed in the upper shelf, the display screen from the portable electronic device will be visible downward through the transparent sheet (1002). With the wireless charger device (1003) embedded in the upper shelf in this embodiment, the portable electronic device inserted into the upper shelf can be wirelessly recharged, as shown in FIG. 10B. Furthermore, the portable electronic device can display an image on its display screen, and this image is subsequently refracted and/or reflected on the transparent display sheet (1006) at approximately 45 degrees relative to the display screen of the portable electronic device to produce a corresponding 3D hologram (e.g. 1009 in FIG. 10B) of the image, as also illustrated in FIG. 10B.

In the preferred embodiment of the invention, the backspace between the rear face of the transparent display sheet (1006) and the rear portion of the main body (1007) provides an additional physical space that accommodates a physical depth perception (i.e. z-axis) for the hologram (e.g. 1009 of FIG. 10B) transformed from the flat display screen of the portable electronic device. Furthermore, the transparent sheet (1002) for the smartphone-holding upper shelf and the transparent display sheet (1006) for displaying holograms may be made of transparent acrylic, plastic, or glass materials. Moreover, in an alternate embodiment of the invention, the detachable holographic display apparatus (1000A) may be made of plastic, rubber, metallic alloy, or a combination thereof, instead of cardboard materials. Furthermore, in some embodiments of the invention, the detachable holographic display apparatus (1000A) may not include and/or utilize the transparent sheet (1002) for the smartphone-holding upper shelf, and instead maintain a void on the smartphone-holding upper shelf to enable a portable electronic device's display screen to project onto the transparent display sheet (1006) directly through the void.

In the embodiment of the invention as illustrated in FIGS. 10A and 10B, the detachable holographic display apparatus (1000A) is made of cardboards or plastic materials, and further incorporates the wireless charger device (1003) and the wireless power supply unit (1001) to charge a portable electronic device while being docked into an upper shelf with its display screen facing downward towards an angled transparent sheet or an angled mirrored sheet. The angled transparent sheet or the angled mirrored sheet provides a refractive and/or reflective holographic 3D image (i.e. 1009 in FIG. 10B) of an image displayed on the flat display screen of the portable electronic device. Furthermore, the detachable holographic display apparatus (1000A) may also incorporate the gesture recognition interface unit (1008) that allows a hand and/or finger gesture-based direct user interaction between the refractive and/or reflective holographic 3D image and the user's hand and/or finger gesture commands.

One advantage of an embodiment of the present invention is providing a novel detachable holographic apparatus that enables visualization of a physical depth axis for real-depth perception of 3D contents generated in a portable electronic device. Furthermore, another advantage of an embodiment of the present invention is providing a novel detachable holographic apparatus with a physical depth axis for real-depth perception to be easily attachable to or detachable from the portable electronic device. In addition, another advantage of an embodiment of the present invention is providing a novel detachable holographic apparatus with a physical depth axis to be easily and inexpensively constructed not only from dedicated mobile device accessory manufacturers, but also from casual consumers with little to no device assembly experience or assembly equipment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims presented herein.

What is claimed is:

1. A detachable holographic display apparatus configured to dock a portable electronic device in an upper shelf to formulate a hologram, the detachable holographic display apparatus comprising:
   a main body that forms a top casing, a left sidewall casing, and a right sidewall casing when folded along two segments of the main body;
   a smartphone holder comprising a rectangular center opening surrounded by a surrounding frame, wherein the smartphone holder is positioned on an upper portion of the main body to form the upper shelf for docking the portable electronic device, wherein the rectangular center opening of the smartphone holder faces a display screen of the portable electronic device;

a wireless charger device embedded into the upper shelf of the detachable holographic display apparatus, wherein the wireless charger is electrically connected to a wireless power supply unit and provides wireless charging to the portable electronic device, when the portable electronic device is inserted into the upper shelf of the detachable holographic display;

the wireless power supply unit uniquely forming a frontal edge of the surrounding frame of the smartphone holder, wherein the frontal edge of the surrounding frame incorporates a first set of electrical wires connecting the wireless power supply unit to the wireless charger device embedded into the upper shelf, and a second set of electrical wires connecting the wireless power supply unit to a gesture recognition interface unit;

a transparent sheet encapsulated by the surrounding frame of the smartphone holder, wherein a frontal edge of the transparent sheet is inserted into a back edge of the wireless power supply unit that forms the frontal edge of the surrounding frame of the smartphone holder, and wherein the transparent sheet completely fills up the rectangular center opening of the smartphone holder to provide a closed bottom surface for holding the portable electronic device in the upper shelf of the detachable holographic display apparatus; and a transparent display sheet or a one-way mirror sheet positioned diagonally inside the main body, wherein the transparent display sheet is angled at forty-five degrees relative to the display screen of the portable electronic device, which is slotted into the upper shelf of the detachable holographic apparatus, and wherein an image projected from the display screen of the portable electronic device is partially refracted or reflected by the transparent display sheet or the one-way mirror sheet to formulate the hologram of the image with a physical depth perception near the transparent display sheet.

2. The detachable holographic display apparatus of claim 1, further comprising a stand attached to a lower frontal portion of the main body, wherein the stand securely holds a lower portion of the transparent display sheet or the one-way mirror sheet at the forty-five degrees relative to the display screen of the portable electronic device.

3. The detachable holographic display apparatus of claim 1, further comprising the gesture recognition interface unit that captures and interprets a hand or finger gesture to direct a user interaction with the hologram.

4. The detachable holographic display apparatus of claim 1, further comprising a base mirror plate attached to the one-way mirror sheet.

5. The detachable holographic display apparatus of claim 1, further comprising an arched roof positioned above the smartphone holder.

6. The detachable holographic display apparatus of claim 1, further comprising one or more tabs protruding from the transparent display sheet, wherein the one or more tabs are inserted into corresponding slits on the main body of the detachable holographic apparatus to provide a secure and angled attachment of the transparent display sheet.

7. The detachable holographic display apparatus of claim 1, further comprising a rear wall attached to a lower portion of the main body, wherein the rear wall provides a backside wall to the main body that forms the top casing, the left sidewall casing, and the right sidewall casing.

8. The detachable holographic display apparatus of claim 1, wherein the transparent display sheet is made of acrylic, glass, or plastic materials.

9. The detachable holographic display apparatus of claim 1, wherein the main body and the smartphone holder are made of cardboards, plastic, rubber, metal, or a combination thereof.

10. The detachable holographic display apparatus of claim 1, wherein the portable electronic device is a smartphone, a tablet computer, or another portable device with a display panel.

* * * * *